United States Patent [19]
Cox

[11] 3,906,901
[45] Sept. 23, 1975

[54] PORTABLE ROUND BALE FEEDER APPARATUS

[76] Inventor: Richard D. Cox, P.O. Box 387, Carrollton, Mo. 64633

[22] Filed: Sept. 26, 1974

[21] Appl. No.: 509,710

[52] U.S. Cl. ................................................ 119/58
[51] Int. Cl.² ........................................... A01K 5/00
[58] Field of Search ................ 119/58, 59, 60, 52 R

[56] References Cited
UNITED STATES PATENTS
2,686,494   8/1954   Garman .............................. 119/58
3,782,333   1/1974   Feterl ................................ 119/52 R Primary Examiner—Hugh R. Chamblee
Attorney, Agent, or Firm—C. Clark Dougherty, Jr.

[57] ABSTRACT

A portable round bale feeder apparatus including a frame having forward and rearward ends, wheels attached to said frame, a floor attached to said frame and upstanding end and side walls. The side walls are adapted to allow livestock feeding therethrough and a gate is disposed at the rearward end of said frame pivotally attached to one of said side walls whereby feed in large round bale form can be easily loaded into said feeder apparatus through said gate.

7 Claims, 4 Drawing Figures

PORTABLE ROUND BALE FEEDER APPARATUS

BACKGROUND OF THE INVENTION

1. Field of the Invention

The present invention relates generally to portable feeder apparatus for feeding hay and the like, and more particularly, but not by way of limitation, to a portable feeder apparatus particularly suitable for feeding hay in large round bale form.

2. Description of the Prior Art

Many various portable feeder apparatus have been developed and used heretofore. Generally, such apparatus include a horizontally disposed frame having wheel means attached thereto and upstanding end and side walls adapted to allow livestock feeding therethrough. Such feeder apparatus have been used to feed hay and other feed to livestock by loading the feed into the apparatus through the open top and then moving the apparatus to fields or other locations where the livestock are confined.

Recently, hay and other similar feed baling apparatus have been developed which form the feed into large round bales. The large round bales of feed have gained acceptance in that the cost of baling is less than conventional baling techniques and less of the feed is exposed to the atmosphere which causes deterioration of the feed. However, a disadvantage of the large bales is that they are heavy (1,000 to 3,000 pounds) and difficult to handle. A particular problem is the loading of such large heavy round bales into conventional feeder apparatus from above the apparatus. Specifically, it has heretofore been necessary to utilize special loading equipment which elevates the bales to a height such that the feeder apparatus can be positioned therebeneath to receive the bales.

By the present invention an improved portable round bale feeder apparatus is provided which can be loaded using conventional farm tractor and fork-lift equipment.

SUMMARY OF THE INVENTION

The present invention relates to a round bale feeder apparatus comprised of a horizontally disposed frame having a forward end and a rearward end. Wheel means are attached to the frame between the forward and rearward ends thereof for portably supporting the frame above the ground surface, and a floor is attached to the top of the frame. An upstanding forward wall is attached to the forward end of the frame and a pair of open side walls adapted to allow livestock feeding therethrough are attached to the forward wall and to the frame on opposite sides thereof. The open side walls are inclined upwardly and outwardly from the frame, and an upstanding end gate is provided at the rearward end of the frame pivotally connected to one of the side walls so that feed in round bales can be loaded into the apparatus at the rearward end of the frame through the end gate.

It is, therefore, a general object of the present invention to provide an improved feeder apparatus particularly adapted to receive feed formed into large round bales.

A further object of the present invention is the provision of a portable round bale feeder apparatus which can be readily and easily loaded utilizing conventional farm tractor equipment.

Other and further objects, features and advantages of the invention will be readily apparent to those skilled in the art upon reading the description of preferred embodiments which follows when taken in conjunction with the accompanying drawings.

DESCRIPTION OF PREFERRED EMBODIMENTS

Figure 1:
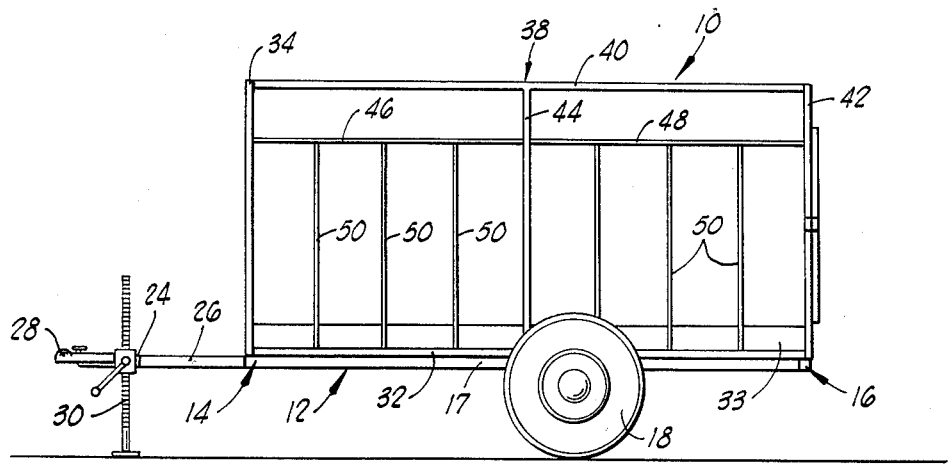
FIG. 1 is a side elevational view of the portable round bale feeder apparatus of the present invention.

Referring now to the drawings, the portable round bale feeder apparatus of the present invention is illustrated and generally designated by the numeral 10. The apparatus 10 is comprised of a horizontally disposed rectangular frame 12 having a forward end 14 and a rearward end 16. The frame 12 is preferably formed from channel type structural members including a forward cross member 13, a rearward cross member 15, and a pair of parallel side members 17.

Figures 2, 3:
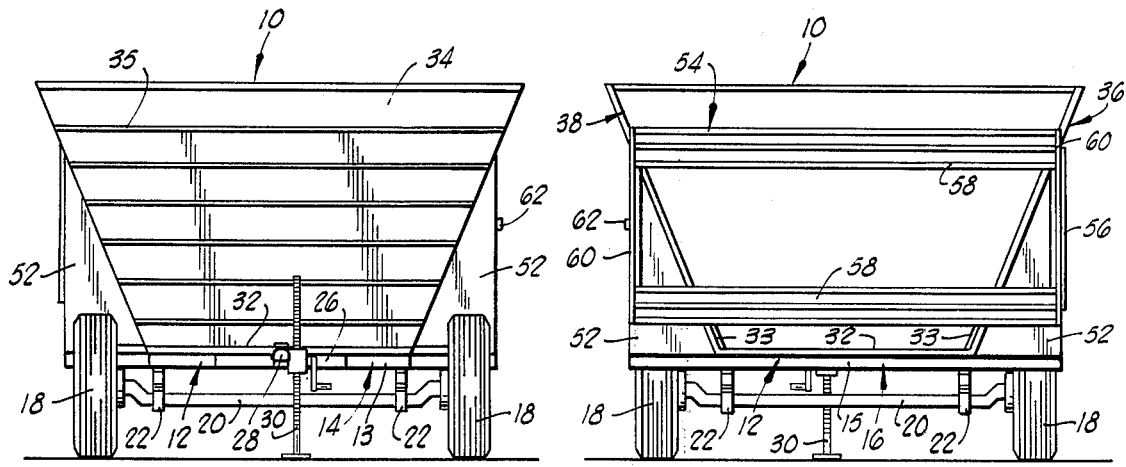
FIG. 2 is an elevational view of the forward end of the apparatus of FIG. 1.
FIG. 3 is an elevational view of the rearward end of the apparatus of FIG. 1.

A pair of wheels 18 is mounted to and beneath the frame 12 between the forward and rearward ends 14 and 16 thereof. As best shown in FIGS. 2 and 3, the wheels 18 are connected in a conventional manner to an axle member 20 which is in turn rigidly attached to the frame 12 by means of axle support members 22.

A draw bar 24 is connected to the forward end 14 of the frame 12 positioned longitudinally with respect thereto. A pair of channel structural members 26 is attached to the draw bar 24 and to the forward end of the frame 12 to provide strength to the draw bar and prevent it from distorting under load. A conventional hitch device 28 is attached to the forward end of the draw bar 24 for connecting the draw bar and the apparatus 10 to a complementary hitch device attached to a vehicle such as a truck or tractor.

A conventional rack and pinion type jack or leveler 30 is attached to the draw bar 24 adjacent the hitch device 28 for elevating the forward end of the apparatus 10 a desired distance above the ground surface.

A substantially flat sheet metal floor 32 which preferably includes angled longitudinal sides 33 to form a trough is welded or otherwise attached to the top of the frame 12, and an upstanding forward wall 34 is attached to the frame 12 at the forward end 14 thereof. Preferably, the forward wall 34 is positioned vertically and is formed of solid sheet metal which can include a plurality of horizontal ribs 35 for providing structural strength thereto. As best shown in FIG. 2, the forward wall 34 is preferably formed of inverted trapezoidal shape.

A pair of upstanding side walls 36 and 38 adapted to allow livestock feeding therethrough is attached to the forward wall 34 and to the side structural members 17 of the frame 12. Preferably, the side walls 36 and 38 are each inclined upwardly and outwardly from the frame 12 whereby they conform to the inverted trapazoidal shape of the forward wall 34. As will be apparent, the outward inclination of the side walls 36 and 38 facilitates the easy loading and fit of large round bales within the apparatus 10 as well as making the feed easily accessible to livestock.

While the side walls 36 and 38 can take a variety of shapes, they are preferably formed from angle iron or tubing to provide a plurality of openings through which livestock can gain access to the feed contained within the apparatus 10 and on the floor 32. As shown best in FIG. 1, each of the walls 36 and 38 include a top horizontal angle member 40 attached to the forward wall 34 and to a vertically positioned angle member 42 disposed at the rearward end 16 of the frame 12. The angle members 42 are attached to the rearward cross member 15 of the frame 12 and are each inclined upwardly and outwardly from the side members 17 of the frame 12 to conform with the inverted trapezoidal shape of the forward wall 34. Each of the side walls 36 and 38 further include an angle member 44 positioned intermediate the forward wall 34 and the rearward angle member 42, the upper end of which is attached to the angle member 40 with the lower end attached to a side member 17 of the frame 12. A pair of bars or rods 46 and 48 are horizontally disposed between and attached to the forward wall 34 and the angle support members 42 and 44, of the sidewalls 36 and 38 and a plurality of vertical rods 50 are disposed between and attached to the rods 46 and 48 and the side members 17 of the frame 12 thereby forming a plurality of access openings for livestock. As illustrated in the drawings, the rods 50 are inclined upwardly and outwardly from the side members 17 of the frame 12 as are the angle support members 42 and 44 so that the enclosure within the apparatus 10 takes the form of an inverted trapezoid when viewed from the rearward end 16 of the frame 12.

The rearward cross member 15 extends outwardly on both sides of the side members 17 of the frame 12 a short distance. As shown best in FIGS. 2 and 3, a pair of triangular sheet metal plates 52 is attached to the extending ends of the cross member 15 and to the angle support members 42. The triangular plates 52 function to support the sides 36 and 38 of the apparatus 10 at the rearward ends thereof and as fenders or mud guards for the wheels 18.

Figure 4:
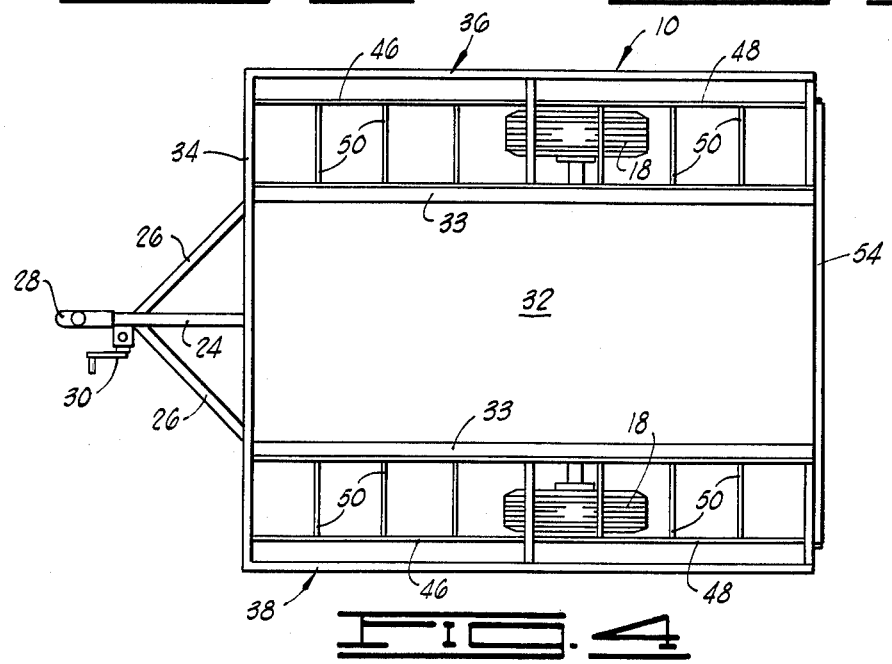
FIG. 4 is a top plan view of the apparatus of FIG. 1.

Referring now specifically to FIGS. 3 and 4, a gate 54 is positioned at the rearward end of the frame 12 pivotally attached to one of the plates 52 by a conventional hinge 56. The gate 54 can take a variety of forms, but preferably includes a pair of horizontally positioned cross members 58 connected together at their ends by vertical structural members 60. A conventional latch device 62 is provided on the opposite side of the gate 54 from the hinge 56 for latching the gate 54 to the apparatus 10. The gate 54 is preferably formed in a manner such that livestock feeding therethrough is permitted.

OPERATION

In operation of the apparatus 10, one or more large round bales are loaded therein through the gate 54 utilizing conventional lift equipment such as a fork lift mounted on a farm tractor. In order to facilitate loading the bales, the forward end 14 of the frame 12 is elevated by operation of the leveler 30 to a position whereby the frame 12 is inclined, i.e., the rearward end 16 of the frame 12 is lowered to a position in close proximity to the ground surface. This allows the use of conventional farm equipment for loading the bales in that the bales need only be lifted a short distance from the ground surface and moved horizontally through the open gate 54 into the apparatus 10. Once one or more bales have been placed in the apparatus 10 the gate 54 is closed and the hitch device 28 attached to a complementary hitch on a tractor or truck so that the apparatus 10 can be moved to the location of livestock. As mentioned above, the forward wall 34 is preferably formed in a manner such that livestock feeding is prevented therethrough. This causes the livestock to feed through the sides 36 and 38 or the end gate 54 of the apparatus 10 which in turn insures an even distribution of the feed to the livestock.

Thus, it will be readily apparent that the present invention is well suited to carry out the objects and attain the ends mentioned as well as those inherent therein. While presently preferred embodiments of the invention have been described for purposes of this disclosure, numerous changes in the arrangement of parts and structure will suggest themselves to those skilled in the art and this invention is to be limited only by the lawful scope of the appended claims.

What is claimed is:

1. A portable round bale feeder apparatus comprising:
   a horizontally disposed frame having a forward end and a rearward end;
   a pair of wheels attached to said frame between said forward and rearward ends thereof for portably supporting said frame above the ground surface and so that the rearward end of said frame can be lowered to a position adjacent the ground surface by elevating the forward end of said frame;
   a substantially flat floor attached to said frame;
   an upstanding forward wall attached to the forward end of said frame;
   a pair of open side walls adapted to allow livestock feeding therethrough attached to said forward wall and to said frame on opposite sides thereof, said side walls being inclined upwardly and outwardly from said frame; and
   an upstanding end gate disposed at the rearward end of said frame and pivotally connected to one of said side walls so that said round bales can be loaded into said apparatus through said end gate at the rearward end of said frame.

2. The round bale feeder apparatus of claim 1 which is further characterized to include hitch means attached to the forward end of said frame for connecting said frame to a motor vehicle.

3. The round bale feeder apparatus of claim 2 wherein said forward wall is adapted to prevent livestock feeding therethrough and said end gate is adapted to permit livestock feeding therethrough.

4. A portable round bale feeder apparatus comprising:
   a horizontally disposed frame having a forward end and a rearward end;
   wheel means attached to said frame between said forward and rearward ends for portably supporting said frame above the ground surface;
   a floor attached to said frame;
   an upstanding forward wall attached to the forward end of said frame;
   a pair of open side walls adapted to allow livestock feeding therethrough attached to said forward wall and to said frame on opposite sides thereof, said side walls being inclined upwardly and outwardly from said frame;

an upstanding end gate disposed at the rearward end of said frame and pivotally connected to one of said side walls so that said round bales can be loaded into said apparatus through said end gate at the rearward end thereof;

means attached to the forward end of said frame for elevating said forward end a desired distance above the ground surface.

5. In a portable feeder apparatus for feeding hay and the like to livestock, said apparatus including a frame having forward and rearward ends, wheels attached to said frame, a floor attached to said frame and upstanding end and side walls adapted to allow livestock feeding therethrough, the improvement whereby feed in the form of round bales can be conveniently loaded into and utilized in said apparatus comprising:

said side walls extending upwardly and outwardly from said frame;

an upstanding gate disposed at the rearward end of said frame pivotally attached to one of said side walls whereby said gate can be selectively opened or closed to allow feed in round bales to be loaded into said feeder apparatus through said gate; and means attached to the forward end of said frame for elevating the forward end of said apparatus a desired distance above the ground surface thereby lowering the rearward end of said apparatus to a position in close proximity to the ground surface during loading of said round bales therein.

6. The apparatus of claim 5 which is further characterized to include hitch means attached to the forward end of said frame for connecting said apparatus to a motor vehicle.

7. The apparatus of claim 6 wherein said forward end wall is adapted to prevent livestock feeding therethrough and said end gate is adapted to permit livestock feeding therethrough.

* * * * *